United States Patent
Gustavsson

(10) Patent No.: US 8,816,841 B2
(45) Date of Patent: Aug. 26, 2014

(54) WARNING SYSTEM

(75) Inventor: Leif Gustavsson, Uddevalla (SE)

(73) Assignee: Binar Aktiebolag, Trollhattan (SE)

( * ) Notice: Subject to any disclaimer, the term of this patent is extended or adjusted under 35 U.S.C. 154(b) by 582 days.

(21) Appl. No.: 13/119,185

(22) PCT Filed: Sep. 25, 2009

(86) PCT No.: PCT/SE2009/051068
§ 371 (c)(1),
(2), (4) Date: Mar. 21, 2011

(87) PCT Pub. No.: WO2010/036198
PCT Pub. Date: Apr. 1, 2010

(65) Prior Publication Data
US 2011/0163868 A1    Jul. 7, 2011

(30) Foreign Application Priority Data
Sep. 25, 2008    (SE) ........................ 0802033

(51) Int. Cl.
*B60Q 1/26*    (2006.01)

(52) U.S. Cl.
USPC ........... 340/468; 340/433; 340/436; 340/463; 340/903

(58) Field of Classification Search
USPC ........... 340/433, 435, 463, 468, 539.23, 903, 340/436; 180/271, 275; 701/300, 301
See application file for complete search history.

(56) References Cited

U.S. PATENT DOCUMENTS

| | | | |
|---|---|---|---|
| 5,132,662 A | 7/1992 | Burch | |
| 5,210,521 A * | 5/1993 | Hojell et al. | 340/436 |
| 5,281,949 A * | 1/1994 | Durley et al. | 340/433 |
| 6,580,362 B1 | 6/2003 | Zimmerman | |
| 6,601,669 B1 * | 8/2003 | Agnew | 180/275 |
| 7,397,349 B2 * | 7/2008 | Lahr et al. | 340/433 |
| 7,812,711 B2 * | 10/2010 | Brown et al. | 340/426.18 |
| 2005/0253694 A1 * | 11/2005 | Kuznarowis | 340/436 |
| 2006/0119473 A1 * | 6/2006 | Gunderson et al. | 340/435 |
| 2008/0106908 A1 | 5/2008 | Englander | |

FOREIGN PATENT DOCUMENTS

| | | |
|---|---|---|
| DE | 29608389 U1 | 9/1996 |
| DE | 19514884 A1 | 11/1996 |
| EP | 1375267 A2 | 1/2004 |
| FR | 2803568 A1 | 7/2001 |
| WO | 2007110654 A1 | 10/2007 |

OTHER PUBLICATIONS

International Search Report and Written Opinion (mailed Dec. 17, 2009).

* cited by examiner

*Primary Examiner* — Hung T. Nguyen
(74) *Attorney, Agent, or Firm* — Jeffrey S. Melcher; Manelli Selter PLLC

(57) ABSTRACT

The present invention relates to a warning system mounted on a vehicle comprising detection means for detecting an object, and signalling means connected to said detection means, wherein said detection means are arranged to remotely detect an object in the vicinity of the vehicle and that said detection means is connected to said signalling means to automatically emit a signal that is detectable from at least one other side of the vehicle than the one where said object is present, and wherein said detection means (4) are arranged to avoid detecting objects lower than 0.5 m, preferably lower than 0.25 m from the ground.

24 Claims, 4 Drawing Sheets

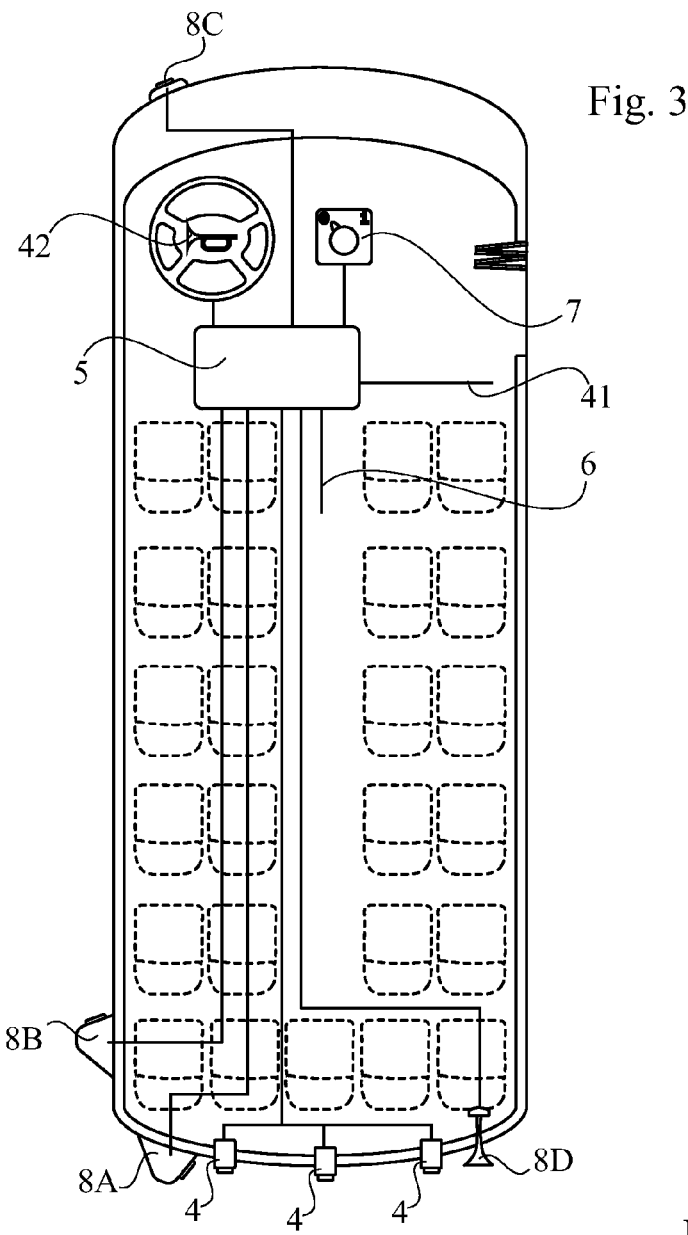
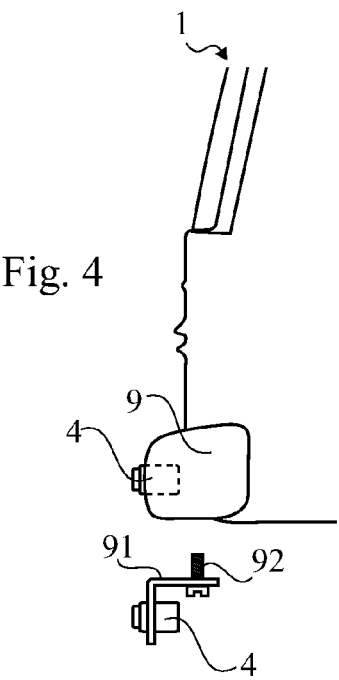
Fig. 3
Fig. 4

WARNING SYSTEM

CROSS-REFERENCE TO RELATED APPLICATIONS

This application is a national stage entry under 35 U.S.C. 371 of International Application No. PCT/SE2009/051068, filed 25 Sep. 2009, designating the United States. This application claims foreign priority under 35 U.S.C. 119 and 365 to Swedish Patent Application No. 0802033-1, filed 25 Sep. 2008. The complete contents of these applications are incorporated herein by reference.

TECHNICAL FIELD

The present invention relates to a warning system mounted on a vehicle comprising detection means for detecting an object, and signalling means connected to said detection means.

BACKGROUND ART

It is well known that there is a substantial risk for accidents when pedestrians walk in front of or behind a large vehicle such as a parked bus, for instance at a bus stop, and trying to cross the road. The driver of an oncoming car often has little or no chance of discovering in time a person thus hidden from view by the bus, and therefore cannot stop the car in time to avoid a serious and often fatal accident.

In order to prevent such accidents, some buses have a warning sign permanently mounted on the vehicle and showing a flashing light when the bus is being used as a school bus, but since this sign does not alert other road-user to an actual dangerous situation but merely informs that children are riding on the bus, the sign tends to be ignored by drivers and it is impossible to distinguish between the times when a child might be crossing the road unseen and the many times when this is not happening.

A safety system for preventing such accidents is shown in U.S. Pat. No. 5,132,662 (Burch), where a crossing arm is lowered in front of the bus when a sensor detects the presence of children in the vicinity. The children are thus prevented from crossing the street directly in front of the bus, in order to lower the risk for accidents. This system, however, cannot prevent persons already present in the area directly in front of the bus from crossing the road and has no means for preventing accidents resulting from persons crossing the road behind the bus and being hit by oncoming traffic.

Another safety system is shown by 2008/0106908 (Englander), where a lighting strip along the side of a schoolbus is lit up when a person is detected in the vicinity of the bus, in order to reduce the risk of people being injured by the schoolbus itself. This system serves to alert the driver of the presence of a person nearby and also to warn the person him- or herself of the danger present. However, the system is not aimed at warning other drivers or road-users, and since the detection area is large and also on the side of the bus rather than only in front or in the back, the system will react to a number of cases which does not imply a risk for pedestrians to get hit by other vehicles. The pedestrian will therefore not connect the lighting strip with this risk, and for passing or oncoming drivers the system does not give a clear indication of the amount of danger present.

There is therefore a need for a warning system that can reduce the risk for accidents in a reliable way.

DISCLOSURE OF THE INVENTION

The object of the present invention is to eliminate or at least minimize the problems described above. This is achieved through a warning system mounted on a vehicle comprising detection means for detecting an object, and signalling means connected to said detection means, wherein said detection means are arranged to remotely detect an object in the vicinity of the vehicle and that said detection means is connected to said signalling means to automatically emit a signal that is detectable from at least one other side of the vehicle than the one where said object is present, and wherein the sensors are arranged to avoid detecting objects lower than 0.5 m, more preferably lower than 0.25 m above ground. Thereby, drivers of passing vehicles can be alerted to the presence of an object such as a pedestrian on the road and accidents can be avoided or the damages resulting from accidents can be substantially decreased. Also, thanks to the fact that detection of low objects can be avoided, the risk for unnecessary warnings set off by small animals or the presence of stones or other objects can be minimised.

According to an aspect of the invention, said detection means comprises a plurality of sensors positioned spread apart in the horizontal transverse direction. Thereby, the presence of an object can be detected in a larger area adjacent to the vehicle than would be possible with only one sensor, and thanks to the placement of these sensors, a detection area of a desired size can be achieved.

According to another aspect of the invention, said plurality of sensors are placed at virtually the same height on said vehicle. Thereby, the mounting of the sensors on said vehicle, along with the design of the desired detection area, can be facilitated and standardized. The said plurality of sensors can also be placed facing in different angles with respect to the longitudinal extension of said vehicle, thereby covering an even larger area in different directions away from the vehicle.

According to a yet another aspect of the invention, a detection area is formed which is arranged to detect a limited vertical range of up to 1.5 m from the ground level.

Thereby, the presence of large objects such as pedestrians can be detected in a reliable manner, According to a further aspect of the invention, said signalling means comprise a plurality of light emitting diodes (LEDs). Thereby, the signalling means can be made clearly visible while at the same time of a low energy consumption.

According to yet another aspect of the invention, a control unit is provided to automatically enable the warning system when certain conditions are fulfilled, preferably including the speed of the vehicle being below 5 km/h. Thereby, the warning system will be in operation when it can be imagined that pedestrians might turn up in the road, such as when the vehicle is halted or close to standing still, but will not emit warning signals when the vehicle is moving faster such as in operation along a road. This can significantly lessen the risk for false alarms from the system.

According to a further aspect of the invention, said control unit is connected to a manoeuvre panel for allowing manual override of the system so that a driver of said vehicle can switch the system on or off. Thereby, the driver can start the system when the situation is appropriate or turn it off when it cannot be of use, such as when the vehicle is parked or not in regular use.

According to another aspect of the invention, the signal horn of the vehicle at standstill is connected to said override, to allow the driver to emit a warning by using the signal horn. Thereby the driver detecting a dangerous situation can immediately give warning to vehicles and pedestrians in the surrounding area, without the need to wait for the system to start when an object is detected by the detection means.

According to yet another aspect of the invention, said control unit is arranged to monitor the status of the detection means so that a driver of said vehicle can be notified if the performance of said detection means is poor. The system can also comprise means for detecting fouling of said sensors indicating the need for service or repair. Thereby, the driver receives indication if the system cannot perform normally.

According to a further aspect of the invention, said detection means and said signalling means are fixedly arranged on the vehicle. Thereby, the risk for moving parts that can be damaged is avoided and the system will present low air resistance when is beneficial in saving fuel for the vehicle and preventing damage to the system.

According to another aspect of the invention, the sensor can be a motion detecting sensor. Thereby, unnecessary warnings set off by the presence of inanimate objects such as parked cars can be avoided.

According to a further aspect of the invention, said control unit is arranged to be used for altering at least one property of said warning system. Also, said at least one property of said warning system is the size of the detection area. Thereby, the warning system can be modified according to the present situation without requiring maintenance work to other parts of the system, such as the replacement of sensors if a different sensibility or range, i.e. detection area, is desired. Such alterations can according to this aspect of the invention be made by modifying the control unit itself, for instance by re-programming said unit.

BRIEF DESCRIPTION OF THE DRAWINGS

The invention will now be described in more detail with reference to the appended drawings, wherein FIG. 3 shows a schematic view of a second embodiment of a warning system according to the invention, FIG. 4 shows two alternatives of mounting sensors on a vehicle.

DETAILED DESCRIPTION OF THE INVENTION

Figure 1:
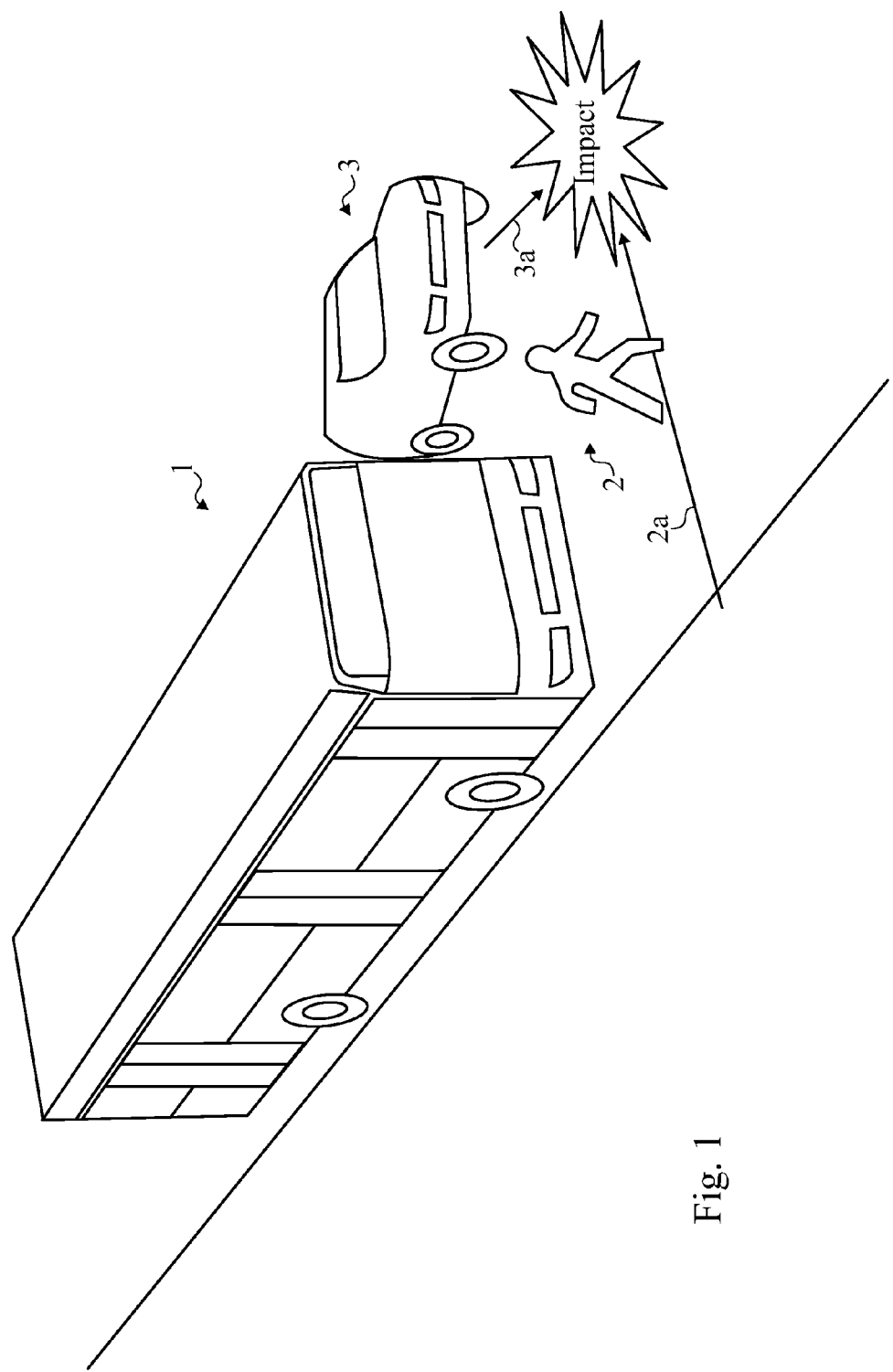
FIG. 1 shows a schematic view of a situation involving a bus, a passing car and a pedestrian.

FIG. 1 shows the situation that the warning system according to the invention is aimed at avoiding. A large vehicle such as a bus 1 is parked on the side of a road, and a pedestrian 2 is crossing said road by walking in front of the bus 1 in the direction shown by a first arrow 2a. A car 3 is overtaking the bus 1 and moving in the direction of a second arrow 3a, and since the area in front of the bus is hidden from the driver of the car 3, the pedestrian 2 cannot be spotted until the car 3 has passed the bus 1 almost completely. At that time, the driver cannot react fast enough to brake the car before the pedestrian 2 is hit in the area where the direction of the arrows 2a and 3a intersect. If the driver of the car 3 had been aware of the presence of the pedestrian 2, that awareness could lead to a general lowering of the speed of the car 3 along with the preparation for braking the car 3, such as placing a foot over the brake pedal, and these factors combined would give the driver the opportunity to completely avoid an accident or at least to lessen the degree of damage in the situation.

Figure 2:
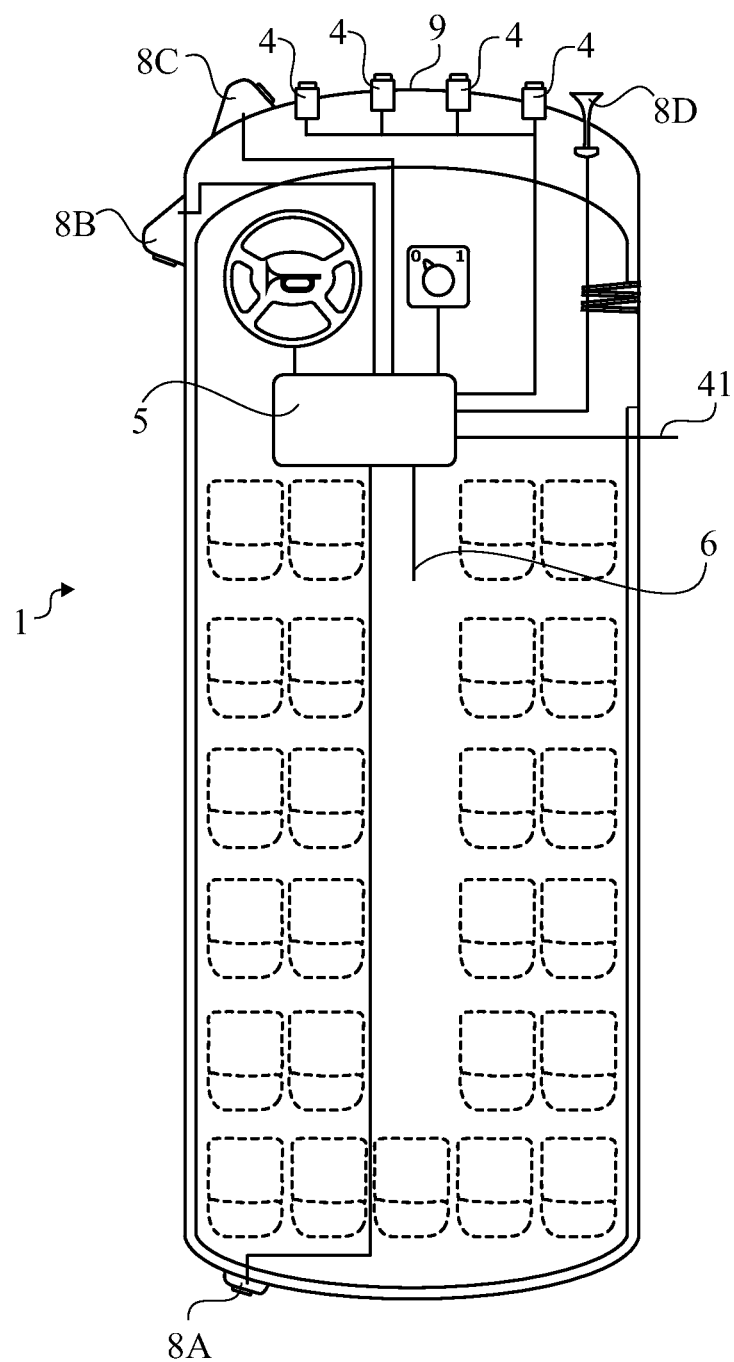
FIG. 2 shows a schematic view of a preferred embodiment of a warning system according to the invention.

FIG. 2 shows a warning system according to a preferred embodiment of the invention, where detection means in the form of a plurality of remotely detecting sensors 4A-4D, preferably touch free sensors such as ultrasonic sensors 4 are mounted on a bus 1 and arranged to detect the presence of an object in front of the bus 1. A control unit 5 is arranged to receive signals from said sensors 4 and to interpret said signals and react appropriately. Warning signals can be emitted by one or all of the signalling means, preferably in the form of emitters 8A, 8B, 8C, 8D as flashing light, steady light, sound or another suitable signal. Emitter 8A is mounted on the back side of the bus at a height of at least 1.5 m above ground, more preferably at least 2 m, and comprises a sign with a number of lights that are arranged to be clearly visible to anyone situated behind the bus 1. Emitter 8B is of the same general appearance but is placed at a height of at least 1 m above ground on the side of the bus 1 that faces the middle of the road, and mounted in an angle that is suitable for the emitter 8B to be clearly visible from an observation point behind or beside the bus 1. Emitter 8C is placed on the front of the bus 1 and is arranged in an angle to be clearly visible to a person present in the detection area in front of the bus 1. This emitter 8C is also formed as a sign with a number of lights, but differs slightly from those described above in a manner which will be described further below, and is placed at a height of about 1 m above ground in order to have an increased visibility to a pedestrian. The fourth emitter 8D is a signal horn and is placed on the front of the bus at a height of at least 2 m above ground in order for the alarm signal to be heard over a larger area. The alarm signal itself has a sound level of at least 100 dB and all these emitters 8A-8D are firmly attached to the bus 1. Since they are not moveable or turnable, this solution is highly cost effective and more reliable than a system where emitters can be easily removed or turned to point in different directions. As the bus 1 moves, the air resistance and risk of damages to the system due to wear and tear can be kept low.

The emitters 8A, 8B, 8C, 8D are thus arranged to emit a signal directed towards a vehicle approaching the bus 1 from behind, in the case of emitter 8A, or a vehicle passing the bus 1, in the case of emitter 8B, or towards the person who is in the front of the bus and has set off the alarm, in the case of emitter 8C and the acoustic warning 8D. A manoeuvre panel 7 for controlling the system is placed in the vicinity of the driver's seat in the bus 1 so that it is easily accessible by the driver during operation of the bus.

As input signals for the system, other stimuli than signals from the sensors 4 can also be used. Such stimuli might include use of the signal horn 42, opening or closing of a door, speed signals, GPS position signals or other route positioning signals, etc., and input can be transferred to the control unit 5. The system also has a connection for power supply 6 and can be powered by the motor of the bus 1 or by another suitable power source. The sensors 4 are placed at a height of 0.4-1 m above ground and are directed in different angles in order to detect objects in different areas adjacent to the bus 1, so that with respect to the longitudinal extension of the bus 1 the sensors are arranged to detect movement in the sectors $\alpha_A$ (−50° to −70°), $\alpha_B$ (−40° to −60°), $\alpha_C$ (40° to 60°), and $\alpha_D$ (50° to 70°), respectively. The detection area thus created by the combination of these sensors reaches from the bumper 9 of the bus and extends about 4 m away from the bus, and reaching to a height of 1.5 m above the ground. The width of the area is about 3 m, thus encompassing the whole area in front of the bus from the side of the road into the middle of the road, but without detecting objects on the sidewalk or in the middle of the road, to thus avoid detecting passing vehicles. The detection area does not encompass the area closest to the ground, in order to avoid detecting small objects or animals that might be present in the area. Preferably, the detection area therefore starts at a height of 0.5 m above ground, more preferably a height of 0.25 m, and thanks to this construction the risk for a false alarm can be substantially lowered. Of course, if the driver were to notice something that were too low for the system to generate an alarm but might still cause an accident, he or she can manually start the system in order for the alarm to go off.

It is beneficial to use motion detecting sensors with the invention, since this in a reliable way can detect the presence of a person in the detection area while at the same time avoiding unnecessary warning signals set off by inanimate objects such as a parked car or a traffic sign.

The emitters 8A, 8B that are aimed at signalling to drivers comprise lights, preferably at least one, preferably at least 4, more preferably at least 8 light emitting diodes (LED) according to regulation ECE R6,5 cat X of the standard set by the UNECE (United Nations Economic Commission of Europe) or the equivalent of light strength by another type of light. The lights are flashing in order to attract attention, and a generic symbol showing a person walking is placed between LEDs in order to be clearly visible when the LEDs are lit up. The symbol is preferably red in color to make the driver even more aware of the danger present, since red is generally associated with danger in traffic signs. The emitter 8B, that is placed along the side of the bus, is placed at a height of at least 1.5 m and directed in an angle that is designed to make the emitter clearly visible to the driver of a passing car. The emitter 8C, placed adjacent to the detection area covered by the sensors 4, is placed at a height of about 1 m and directed to be clearly visible to a person present in the detection area itself. This emitter 8C also comprises a sign with LEDs that can show a flashing light, and between them the generic symbol of a car is placed. This symbol is also red in color in order to increase visibility and the possibility for the sign to be interpreted as a warning. The emitter 8D is a siren that serves to give persons in the area a clear acoustic warning when the system is in operation, in order to emphasize the danger of the situation. This is also beneficial in that this combination of different signals can be detected even by persons who have damages to their eyesight or hearing and might not notice a signal consisting only of light or sound.

A second embodiment is shown by FIG. 3, where sensors 4 are arranged for detecting the presence of an object behind the bus 1 rather than in front. The system is otherwise similar to the preferred embodiment described above, with a control unit 5 for interpreting the signals from said sensors 4 and emitters 8A, 8B, 8C, 8D for emitting warning signals from the bus. This embodiment is suitable for detecting the presence of a person 2 behind the bus 1 and for warning vehicles approaching from the front of the bus 1, since the person situated behind said bus 1 is thus hidden from view. The emitters 8A and 8D are now directed towards the person behind the bus in the vicinity of sensors 4, while emitters 8B and 8C are directed towards a vehicle passing the bus and approaching the bus from the front, respectively.

FIG. 4 shows two possible ways of mounting a sensor 4, either by placing said sensor 4 integrated into the bumper 9 of the bus 1, or by mounting the sensor 4 below the bumper 9 on a mounting structure 91 and fastening means such as a screw 92. The sensors 4 can be mounted together on a mounting frame extending along the bumper 9 at the front of the bus 1 or be mounted one at a time on a mounting structure such as that shown in this figure. If the sensors 4 are to be mounted on another side of the bus, what is said here with the reference to the front of the bus can of course be applied to any other part of the bus.

The warning system according to the invention can be built into the bus 1 at the construction of said bus 1, but can also easily be applied to an older bus 1 that has already been in use for some time or to another kind of vehicle altogether, such as for instance a truck.

Figure 5:
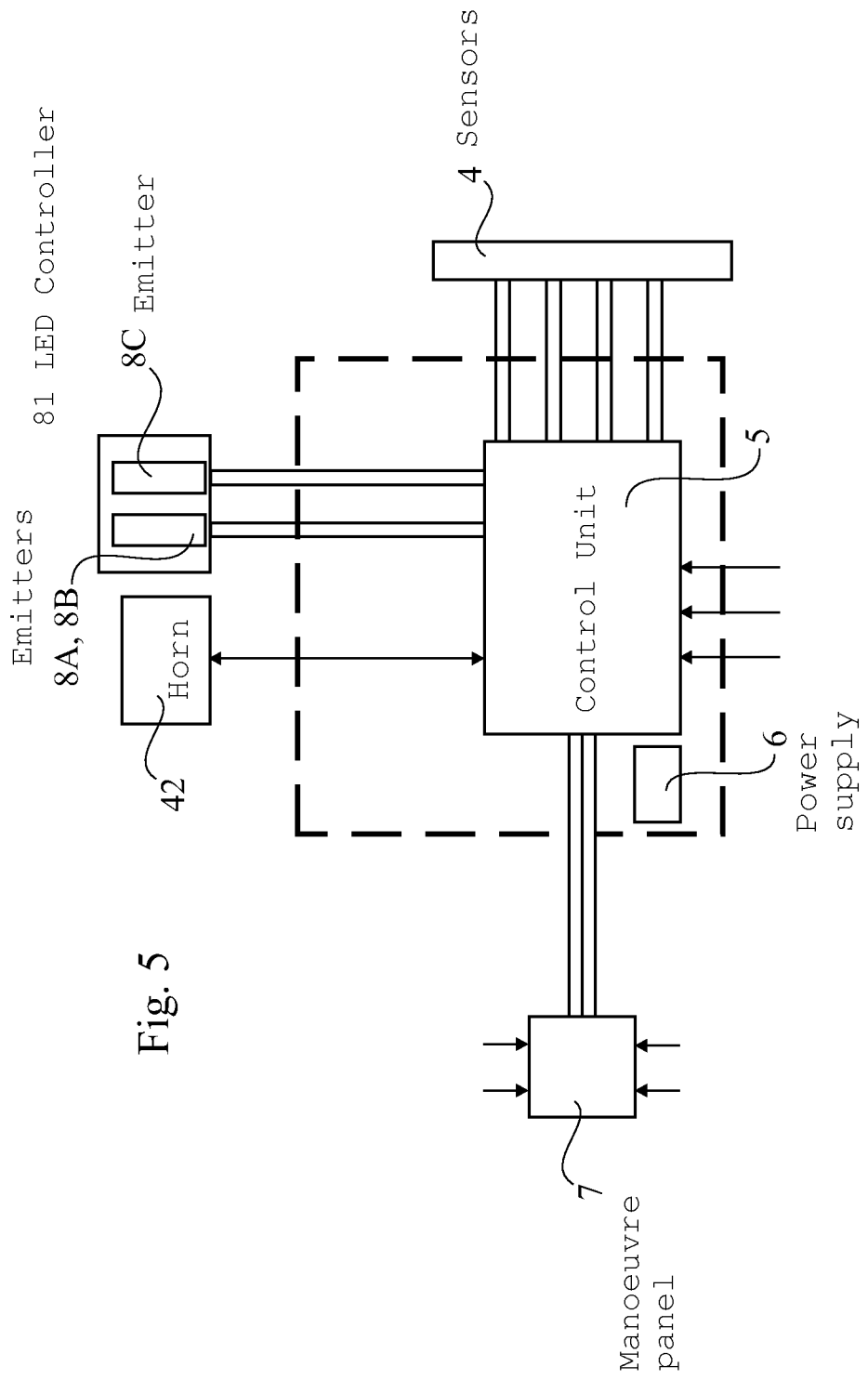
FIG. 5 shows system schematics for an embodiment of the warning system.

The operation of the warning system will now be described in detail below with reference to FIG. 2 and to FIG. 5. When certain conditions are fulfilled, such as when the bus 1 is moving at a speed of less than 5 km/h or standing still at the side of a road, for instance for letting passengers embark or disembark, the warning system is automatically enabled by the manoeuvre panel 7. The system can also be manually activated by the driver by use of the manoeuvre panel 7, but for securing a reliable use of the system in all situations where it might be useful, an automatic switching on is preferred. To use the system while the bus 1 is moving faster than walking speed, i.e. 5 km/h, is generally not desired, since there is a risk for nearby cars or other objects unnecessarily triggering the warning signals.

While the bus 1 is standing still, the sensors 4 are active and monitoring the detection area in front of, or with respect to the embodiment of FIG. 3, behind the bus. It is to be noted that everything that is described here with reference to FIG. 2 might also be applied to the embodiment of FIG. 3 in the case of an object detected behind the bus 1 by the sensors placed as in this figure. A combination of sensors, placed on several sides of the bus, can also be used with the invention.

If a pedestrian enters the detection area while the bus 1 is standing still, a dangerous situation has arisen. If the pedestrian attempts to cross the road, he or she will be hidden from view for any vehicle approaching the bus from behind, and the result might be an accident such as is described above with reference to FIG. 1. However, when the warning system according to the invention is active, the sensors 4 will detect this presence and send signals to the control unit 5 where they are processed. If the signals are decided to imply the presence of a pedestrian, a signal is sent to the LED controller 81 which sets off the emitters 8A, 8B, 8C so that flashing lights are lit up in order to warn any drivers present in the area around the bus 1 as well as the pedestrian present in the detection area. If desired, a signal is also sent to the siren 8D so that an acoustic signal is also emitted from the bus 1. The driver of an approaching car will now be made aware of the situation, and can slow down or prepare to do so, in order to avoid the possible accident altogether or to lessen the degree of damage done to the pedestrian. At low speeds, the fact alone that the driver is alerted to the danger and has placed his or her foot on the brake pedal is often enough to shorten the reaction time of the driver, enabling him or her to stop completely before the pedestrian is hit.

If a dangerous situation arises but the warning system does not give off a warning, the driver of the bus 1 may use an override mechanism to set off the warning manually by using the signal horn 42 in the bus, thus giving a signal via a suitable connection to the control unit 5 which can now start the emitters 8A, 8B, 8C, 8D.

The manoeuvre panel 7 is also equipped with means, e.g. a series of lights, for showing the driver of the bus 1 if the system is working properly, if the sensors 4 need service in order to function, and other system data that might be of interest to the driver. It is also possible for the driver to manually switch off parts of the system, such as for instance the emitter 8D that comprises an acoustic signal, in order to use the warning system more appropriately in areas where loud noises might be inappropriate. This might also be partly automated, so that the part of the system comprising the acoustic signal is automatically switched on again in response to a particular condition, such as when the bus 1 reaches a certain speed, for instance.

By modifying the properties of the control unit 5, the warning system can be adapted according to the requirements of the present situation. Thereby, the size of the detection area or other properties of the sensors 4 or of the emitters and siren 8A-D can, for instance, be altered without requiring cumbersome alterations to the system such as adding or removing components manually. Also, the performance of the system can be monitored and data presented, for instance to the driver or to a maintenance crew, in order for assessments of the system to be made in an easy and reliable manner. Thereby, the driver can determine if a response from the system is reasonable in a specific situation, for instance by comparing the signals from the system with what the driver him- or herself can see in the detection area. If a presence is detected when the driver is sure that there is no reason for the alarm to go off, or if no presence is detected although a person is standing in the detection area, this information can be used for operating the system manually or for shutting the system off and calling for maintenance, for instance.

The invention is not to be seen as limited by the embodiments described above and can be varied within the scope of the appended claims. It is for instance possible to use different number or different kinds of sensors, such as motion detecting sensors, ultrasound sensors, radar sensors, etc., as well as different types of light and sound emitters. The detection area for the sensors can extend in different directions around the bus and is not necessarily limited to the short sides of the bus. The emitters giving off warning signals can also be removable in order to facilitate cleaning or repair, and different kinds of light sources can be used with them.

The invention claimed is:

1. A warning system mounted on a vehicle comprising:
   detection means for detecting an object on a first side of a vehicle; and
   signalling means connected to said detection means, wherein said detection means is arranged such that when the object is detected in the vicinity of the first side of the vehicle said signalling means emits a signal that is detectable from at least one other side of the vehicle than the first side, and wherein said detection means is arranged to avoid detecting objects lower than 0.5 m from the ground.

2. The warning system according to claim 1, wherein said detection means are arranged to avoid detecting objects lower than 0.25 m from the ground.

3. The warning system according to claim 1, wherein said detection means comprises at least one touch free sensor.

4. The warning system according to claim 3, wherein said detection means comprises a plurality of sensors positioned spread apart in the horizontal transverse direction.

5. The warning system according to claim 4, wherein said plurality of sensors are placed at substantially the same height on said vehicle.

6. The warning system according to claim 4, wherein said plurality of sensors are placed facing in different angles with respect to the longitudinal extension of said vehicle.

7. The warning system according to claim 4, whereby combining the areas where each detection means can detect the presence of an object and that said combined detection area has a length of at least 1 m, a width of at least 1 m, and a height of at least 0.5 m.

8. The warning system according to claim 4, whereby combining the areas where each detection means can detect the presence of an object and that said combined detection area has a length of at least 2 m, a width of at least 2 m, and a height of at least 1 m.

9. The warning system according to claim 4, whereby combining the areas where each detection means can detect the presence of an object and that said combined detection area has a length of at least 3 m, a width of at least 3 m, and a height of at least 1.5 m.

10. The warning system according to claim 1, wherein said detection means comprises at least one ultrasonic sensor.

11. The warning system according to claim 1, wherein a detection area is formed which is arranged to detect a limited vertical range of up to 1.5 m from the ground level.

12. The warning system according to claim 1, wherein said signalling means comprise at least one light emitting diode (LED), LEDs according to regulation ECE R6,5 cat X.

13. The warning system according to claim 1, wherein said signalling means comprise at least four light emitting diodes (LED), LEDs according to regulation ECE R6,5 cat X.

14. The warning system according to claim 1, wherein said signalling means comprise at least eight light emitting diodes (LED), LEDs according to regulation ECE R6,5 cat X.

15. The warning system according to claim 1, wherein a control unit is provided to automatically enable the warning system when certain conditions are fulfilled, including the speed of the vehicle being below 5 km/h.

16. The warning system according to claim 15, wherein said control unit is connected to a manoeuvre panel for allowing manual override of the system so that a driver of said vehicle can switch the system on or off.

17. The warning system according to claim 16, wherein the vehicle comprises a signal horn, and wherein said signal horn of the vehicle at standstill is connected to said override to allow the driver to emit a warning by using the signal horn.

18. The warning system according to claim 15, wherein said control unit is arranged to monitor the status of the detection means so that a driver of said vehicle can be notified if the performance of said detection means is poor.

19. The warning system according to claim 18, whereby means for detecting fouling of said sensors indicate the need for service or repair.

20. The warning system according to claim 15, wherein said control unit is arranged to be used for altering at least one property of said warning system.

21. The warning system according to claim 20, wherein said at least one property of said warning system is the size of the detection area.

22. The warning system according to claim 1, wherein said detection means and said signalling means are fixedly arranged on the vehicle.

23. The warning system according to claim 1, wherein said detection means is a motion detecting sensor.

24. A method of providing a warning to moving vehicles and/or pedestrians in the vicinity a slow moving or stopped vehicle comprising the steps of:
   detecting an object on a first side of a first vehicle, wherein objects lower than 0.5 m from the ground are not detected on the first side of the first vehicle; and
   providing a warning signal to a second vehicle that is moving and/or to a pedestrian in a vicinity of the first vehicle that is detectable from at least one other side of the first vehicle than the first side, the warning signaling that the object is present on the first side of the first vehicle, wherein the warning signal is only provided when the first vehicle is stopped or is moving below 5 km/h.

* * * * *